US007376662B2

(12) United States Patent
Caparas et al.

(10) Patent No.: US 7,376,662 B2
(45) Date of Patent: May 20, 2008

(54) TRAVEL UPDATE MESSAGING SYSTEM AND METHOD

(75) Inventors: Rolando Caparas, Roswell, GA (US); Steve Ackerman, Chicago, IL (US)

(73) Assignee: Orbitz LLC, Chicago, IL (US)

( * ) Notice: Subject to any disclaimer, the term of this patent is extended or adjusted under 35 U.S.C. 154(b) by 288 days.

(21) Appl. No.: 10/205,829

(22) Filed: Jul. 26, 2002

(65) Prior Publication Data
US 2004/0019606 A1    Jan. 29, 2004

(51) Int. Cl.
*G06F 17/30*    (2006.01)
(52) U.S. Cl. ............... 707/102; 707/10; 707/104.1; 709/203; 701/201
(58) Field of Classification Search ............... 707/1, 707/10, 102, 104.1; 709/203, 206; 701/200, 701/201; 715/200, 234
See application file for complete search history.

(56) References Cited

U.S. PATENT DOCUMENTS

| | | | | |
|---|---|---|---|---|
| 5,400,020 A | | 3/1995 | Jones et al. | 340/994 |
| 5,623,260 A | | 4/1997 | Jones | 340/994 |
| 5,657,010 A | | 8/1997 | Jones | 340/994 |
| 5,897,620 A | * | 4/1999 | Walker et al. | 705/5 |
| 5,948,040 A | * | 9/1999 | DeLorme et al. | 701/201 |
| 6,161,097 A | * | 12/2000 | Glass et al. | 705/6 |
| 6,249,913 B1 | * | 6/2001 | Galipeau et al. | 725/76 |
| 6,278,936 B1 | | 8/2001 | Jones | 701/201 |
| 6,278,965 B1 | * | 8/2001 | Glass et al. | 703/22 |
| 6,313,760 B1 | | 11/2001 | Jones | 340/994 |
| 6,317,060 B1 | | 11/2001 | Jones | 340/994 |
| 6,360,205 B1 | * | 3/2002 | Iyengar et al. | 705/5 |
| 6,363,323 B1 | | 3/2002 | Jones | 701/213 |
| 6,393,359 B1 | * | 5/2002 | Flynn et al. | 701/120 |
| 6,411,891 B1 | | 6/2002 | Jones | 701/201 |
| 6,415,207 B1 | | 7/2002 | Jones | 701/1 |
| 6,486,801 B1 | | 11/2002 | Jones | 340/994 |
| 6,492,912 B1 | | 12/2002 | Jones | 340/994 |
| 6,496,568 B1 | * | 12/2002 | Nelson | 379/88.12 |
| 6,510,383 B1 | | 1/2003 | Jones | 701/209 |

(Continued)

OTHER PUBLICATIONS

Apperley Mark, Fletcher Dale, Rogers Bill, and Thomson Kirsten, "Interactive Visualisation of a Travel Itinerary", ACM, 2000, pp. 221-226.*

(Continued)

*Primary Examiner*—Cheryl Lewis
(74) *Attorney, Agent, or Firm*—Wildman, Harrold, Allen & Dixon LLP

(57) ABSTRACT

The present invention relates to a system and method for gathering and analyzing data related to travel conditions and generating and sending a message explaining the travel conditions to one or more travelers. The present invention includes a travel conditions analyzer which accesses data and information from several different databases such as weather condition websites and travel websites. The data and information from the databases is analyzed and predictions on travel delays are made based on the data and information. A messaging tool determines a group of travelers that are affected by the adverse travel conditions. Then the messaging tool generates a message based on the travel conditions and sends the message to one or more affected travelers. The affected travelers can therefore change their travel plans or make other arrangements as needed based on the information contained in the message. Thus, the present invention significantly minimizes the inconveniences caused to travelers due to adverse travel conditions.

26 Claims, 18 Drawing Sheets

U.S. PATENT DOCUMENTS

| | | | |
|---|---|---|---|
| 6,618,668 B1 | 9/2003 | Laird | 701/204 |
| 6,683,542 B1 | 1/2004 | Jones | 340/994 |
| 6,700,507 B2 | 3/2004 | Jones | 340/994 |
| 6,711,548 B1* | 3/2004 | Rosenblatt | 705/6 |
| 6,714,859 B2 | 3/2004 | Jones | 701/201 |
| 6,754,581 B1* | 6/2004 | Blachowicz et al. | 701/202 |
| 6,810,527 B1* | 10/2004 | Conrad et al. | 725/76 |
| 6,816,786 B2* | 11/2004 | Intriligator et al. | 702/3 |
| 6,842,737 B1* | 1/2005 | Stiles et al. | 705/6 |
| 2003/0036928 A1* | 2/2003 | Kenigsberg et al. | 705/5 |
| 2003/0036930 A1* | 2/2003 | Matos et al. | 705/5 |

OTHER PUBLICATIONS

Chariton Craig and Choi Min-Hyung, "Enhancing Usability of Flight and Fare Search Functions for Airline and Travel Web Sites", Proceedings of the International Conference on Information Technology: Coding and Computing (ITCC'04), IEEE, Aug. 2004, pp. 1-6.*

Dogac A., Kabak Y., Laleci G., Sinir S., Yildiz A., Kirbas S., and Gurcan Y., "Semantically Enriched Web Services for the Travel Industry", SIGMOD, vol. 33, No. 3, Sep. 2004, pp. 21-27.*

* cited by examiner

FIG. 5

NATIONAL AIRSPACE SYSTEM STATUS (Note: This page will refresh every 5 minutes. Last updated Wed. 5 Jun 2002 17:26:38 UTC.) Provided by the FAA's Air Traffic Control System Command Center

MISCELLANEOUS

NEXT PLANNING TELCON 1715Z

GROUND DELAY PROGRAMS

| ARPT | START | END | FACILITIES | REASON | MAX | AVG | AAR | PR |
|---|---|---|---|---|---|---|---|---|

GROUND STOPS — 208

| ARPT | TIME | | FACILITIES | | REASON | | | |
|---|---|---|---|---|---|---|---|---|
| ORD | 1759 | | ZAU1 | | WEATHER, LOW CIGS/VIS | | | |

DELAY INFO

| ARPT | AD | DD | TIME | REASON |
|---|---|---|---|---|
| PHX | | +15 | 1638 | MULTI-TAXI |

AIRPORT CLOSURES — 212

| ARPT | TIME | REASON | REOPEN |
|---|---|---|---|

DEICING

| ARPT | AAR/ADR | TIME | PLAN? |
|---|---|---|---|

Runway/Equipment Info

This is not a complete list of Runway/Equipment Status. Please consult the current NOTAMs for complete information

| Facility | Description |
|---|---|
| DTW | RWY 22L DISPLACED THRESHOLD. RUNWAY NOT AVBL TO ARRIVAL TRFC |
| JFK | RWY 4R EDGE/CENTERLINE LIGHTS OTS UNTIL NOVEMBER UNABLE CAT II/III |

ATCSCC OIS SYSTEM
6/5/2002

OIS Main Menu
- NAS Status
- East Directory
- West Directory
- Planning Team
- Severe Weather
- National Playbook
- Tier Info

200

ATCSCC Text Only National Airport Status

NATIONAL AIRPORT STATUS SUMMARY
provided by the FAA's Air Traffic Control System Command Center Welcome to the Air Traffic Control System Command Center's text only real-time airport status page. This page lists all major U.S. airports that are either experiencing delays or are affected by a traffic management initiative. Select an airport from the drop-down list to obtain more detailed delay information.

The status information provided on this site indicates general airport conditions; it is not flight-specific. Check with your airline to determine if your flight is affected.

208

| General Arrival/Departure Delays |
|---|
| • Philadelphia International Airport, Philadelphia, PA (PHL) |

210  212

Select an Airport: [-----Select an Airport-----  ▼]  [Get Airport Info]

[ATCSCC Home] [Redisplay National Airport Status]

Please contact our Webmaster with questions or comments.

FIG. 7

ATCSCC Text Only National Airport Status

AIRPORT STATUS INFORMATION
provided by the FAA's Air Traffic Control System Command Center

| Philadelphia International Airport (PHL) Real-time Status |
|---|
| The status information provided on this site indicates general airport conditions; it is not flight-specific. Check with your airline to determine if your flight is affected. |
| Delays by Destination: No destination-specific delays are being reported. |
| General Departure Delays: Due to MIT, traffic is experiencing Gate Hold and Taxi delays between 16 minutes and 30 minutes in length and increasing. |
| General Arrival Delays: Arrival traffic is experiencing airborne delays of 15 minutes or less |

This information was last updated: Wed Jun 12 08:49:18 2002 EDT ◀— 214

Glossary of Air Traffic Management Terms - A table containing definitions and/or descriptions of many common Air Traffic Management acronyms.

Select an Airport: [-----Select an Airport----- ▼]  210    [Get Airport Info]  212

[ATCSCC Home] [Redisplay National Airport Status]

Please contact our Webmaster with questions or comments.

FIG. 8

TRAVEL UPDATE MESSAGING SYSTEM AND METHOD

BACKGROUND OF THE INVENTION

The present invention relates to a travel update messaging system and method which notifies travelers of travel conditions which may affect their travel arrangements. The invention is particularly adapted to notify airline passengers whether their flights are on schedule or whether they are likely to encounter delays at various points of travel within their itinerary such as their point of departure, destination or any stops scheduled in between. The system and method of the present invention may also be used to notify other types of travelers such as railway passengers, boat passengers, bus passengers, and other types of travelers of travel conditions affecting their selected mode of traveling. The present invention may also be used to notify travelers of important events occurring at their destinations which may affect their travel plans.

Many people reserve, book and purchase their travel arrangements over the internet. Typically, these people make their travel arrangements using a travel website where they purchase airline flights, rent cars or purchase hotel rooms. Thus, the online travel websites provide several different services for travelers where a traveler can virtually make all of their travel arrangements on the website. In particular, many travelers purchase airlines tickets on one of several travel websites on the internet. Typically, travelers use a personal computer to access one or more of the travel websites. On these websites, the travelers can gather information regarding airline flights that relate to the traveler's desired destination, travel dates and times. The traveler then reserves and purchases the tickets for the destination and travel dates desired by the traveler.

Afterwards, the travelers go to the airport on the date of their flight to board the flight and travel to their desired destination. However, depending on the weather conditions, air traffic volume, mechanical delays or other events, the traveler's flight frequently does not leave the airport at its scheduled time. Usually travelers do not learn of pending flight delays until their original departure time has passed. In this circumstance, the passenger is stuck in the airport to either wait for the delayed period of time or make other travel arrangements. Typically, this results in inconveniences to the passengers and an investment of a substantial amount of time and possibly money to finally get to their desired destination. In other circumstances, travelers or passengers find out about travel delays by calling the airport or airline ahead of time. However, if weather conditions change or another delay occurs while the passenger is en route to the airport, the passengers find out about the delay once they arrive at the airport. In this situation the passengers experience the same inconveniences as described above.

Therefore, there is a need for a messaging system which alerts travelers or passengers about flight delays related to the flights in which the passengers purchased tickets. Specifically, the messaging system should notify ticketed passengers in such a way that the inconveniences to the passenger are minimized and the traveler is given the opportunity to more efficiently manage his or her wait time while at the airport. Additionally, there is a need for a messaging system that identifies the types of delays and the length of the delays and sends a message to the passengers so that passengers can make alternate travel arrangements to accommodate their traveling needs.

SUMMARY OF THE INVENTION

The present invention relates to a system and method for gathering and analyzing data related to travel conditions and generating and sending a message explaining the travel conditions to one or more travelers. According to the invention, data and information related to travel conditions on specific modes of travel such as airline travel are gathered from various data sources. The data and information are analyzed and predictions on travel delays are made based on the travel data and information. The travel delays are cross-referenced with ticketed passengers who are likely to be affected by those delays and a message is generated and sent to those affected passengers. The affected passengers are thereby informed of the travel delays and can anticipate the delays and make other travel arrangements accordingly.

According to one embodiment, the system and method of the present invention are used to notify airline passengers of flight delays or the absence thereof. In this embodiment, a travel conditions analyzer gathers information regarding weather and flight conditions and makes predictions regarding travel conditions based on the information. It should be appreciated that the travel conditions analyzer may be an automated, semi-automated or manual system.

For example, various predictive rules may be implemented in software such that, based on various combinations of inputs certain delay patterns can be identified and predicted. Alternatively, various input patterns may be recognized by the system and brought to the attention of a human operator who may then make predictions more easily based on the preprocessed or filtered data. Finally, the system analyzer function may be performed completely manually. In this arrangement a skilled professional having extensive experience in air traffic control and FAA delay management gathers and interprets information manually and makes predictions about delays himself.

The weather information gathered by the analyzer may be obtained from any suitable weather website or database which generates data regarding present and future weather conditions. Similarly, airline travel information may be obtained from several airline-related websites such as the Federal Aviation Administration website and websites related to specific airlines. Once the user gathers the information from these databases with the analyzer, the user makes predictions based on the data and information. The predictions estimate where flight delays may occur and also how long those delays may be at that particular location. Additionally, the predictions may be regarding several airports or a specific airport or flight at that airport.

After the user determines where flight delays will occur, the user generates a prompt or message which explains the flight delays. The message may include any suitable information such as the type of flight delay and the length of the flight delay. The user uses a messaging tool which includes software developed to determine which passenger or passengers will be affected by the flight delays. The messaging tool cross references ticketed passengers on particular flights with the flights that are affected by adverse travel conditions. In one embodiment, the user manually generates a prompt or message as described above which is input to the messaging tool and sent by the messaging tool to the affected passengers. In another embodiment, the predictions are associated with codes relating to types of flight delays. The messaging tool analyzes the codes and automatically generates a message based on the code or codes. In both embodiments the message is sent to the passenger's or traveler's preferred mode of communication which may be electronic mail, voicemail, a digital message sent to a paging device or personal digital assistant or any suitable communication device or method. Once the passenger receives the information, the passenger may make alternate travel arrangements or other plans accordingly. In addition to flight delay information, messages can be generated on other topics which may impact a traveler's travel plans. For example, messages may announce special exhibits which are open at a traveler's destination which the traveler may wish to attend or messages may describe political unrest or public worker strikes and the like which may negatively impact a traveler's stay when she reaches her destination.

In one embodiment of the present invention, additional information such as flight information ("FLIFO") may be sent as a separate text message to one or more passengers. FLIFO is flight information generated by each of the airlines to announce the flight status of that airline's flights. When FLIFO is generated by an airline, the FLIFO is sent to a Global Communication System ("GDS") such as Worldspan. The user accesses the GDS with the messaging tool, which is connected to the GDS using a communication line such as a telephone line or other suitable connection. The messaging tool determines if the FLIFO includes an error. If the FLIFO is acceptable, the messaging tool determines the ticketed passengers who are affected by the FLIFO and automatically sends the FLIFO to those affected passengers. By default, the messaging tool sends the FLIFO to the affected passengers as an electronic mail message. However, passengers may change their preferred method of receiving messages to any suitable method or device such as voice mail or facsimile transmission. If the messaging tool determines that there is an error in the FLIFO, the FLIFO is delivered to a manual cue in the travel conditions analyzer, which enables the user to manually edit the FLIFO. The travel conditions analyzer determines the correct information that should be contained in the FLIFO based on at least one data source such as a weather website or an airline website. The user then manually corrects the FLIFO and re-sends the corrected FLIFO to the messaging tool to be sent to the affected passengers.

Additionally, a text message may be attached to the FLIFO depending on several factors such as the types of delays and the length of the delays. The text message may include any suitable information such as restaurant, hotel and car rental information. This information is used by the affected passengers to make alternate plans and/or alternate travel arrangements, if necessary. For example, if the FLIFO indicates that an affected passenger's flight departure is delayed for two hours, a text message describing restaurants located near the airport and directions to those restaurants could be sent to the passenger.

In one embodiment, the text message is generated and attached to the FLIFO automatically. In this embodiment, the text messages are input into the messaging tool and include codes associated with predetermined information such as airport names, length of the flight delays and airline names. The text messages may include any suitable information such as the location of nearby restaurants, the location of bookstores or other messages that may be useful to the passenger if a particular flight is delayed for a long period of time. Also, the message may include information such as nearby hotels and hotel availability, rental car information and location, or the location of alternate modes of transportation in the event that the flight is delayed for a substantial period of time or the flight is cancelled. The text messages may be sorted according to one or more of the above factors. It should be appreciated that other suitable information may be used to sort the text messages. Based on the FLIFO and the status of the affected passenger such as the location of the passenger, the messaging tool generates the appropriate text message and sends it to the affected passenger. Alternatively in another embodiment, the user manually generates a text message similar to the message described above, attaches the text message with the FLIFO and sends the FLIFO and text message to the affected passenger or passengers.

The system and method provided by the present invention enables travelers or passengers to make alternate travel arrangements and accommodations in the event that their particular mode of travel, such as flight travel, is delayed for any reason. This is particularly useful to minimize the inconveniences experienced by travelers when their travel arrangements are affected by adverse travel conditions. Additional features and advantages of the present invention are described in, and will be apparent from, the following Detailed Description of the Invention and the figures.

BRIEF DESCRIPTION OF THE FIGURES

FIG. 5 is a screen shot of a data source used in one embodiment of the system and method of the present invention.

FIG. 7 is a screen shot of a specific airport identified in FIG. 6.

FIG. 8 is a screen shot of detailed flight delay information for the airport identified from FIGS. 6 and 7.

DETAILED DESCRIPTION OF THE INVENTION

The present invention relates to a system and method for gathering and analyzing data related to travel conditions and generating and sending a message explaining the travel conditions to one or more travelers. In one presently preferred embodiment, the system of the present invention is configured to analyze airline flight data and information. In this embodiment, airline flight data and information are gathered and analyzed to determine flight conditions. Based on the status of current and future flight conditions, a message is generated and sent to a group of affected passengers who are ticketed for the flights that are delayed by various travel conditions. For example, weather information and airline flight arrival and departure information may be analyzed to determine how passengers on specific flights are affected by flight delays at certain airports or airports within a particular region or area. A text message explaining the flight delay such as the expected time of the delay and the cause of the delay is generated and sent to the ticketed passengers who are on the flights affected by the delay. It should be appreciated that the present system and method may be used for other types of travel such as travel by train, boat, bus or other modes of transportation.

Figure 1:
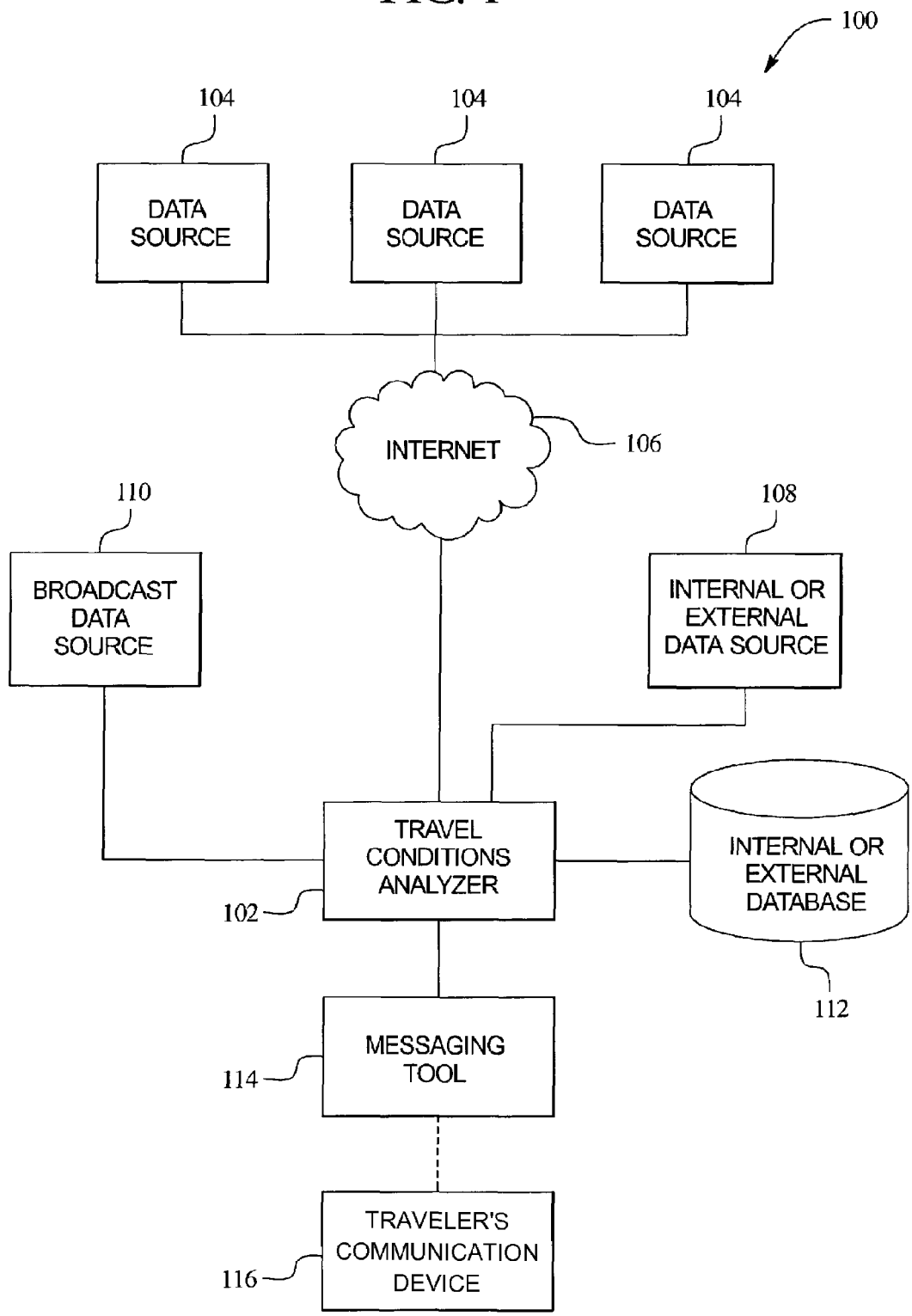
FIG. 1 is a block diagram of a system of the present invention which utilizes data regarding travel conditions and generates and sends a message explaining the travel conditions to one or more travelers.

Referring now to FIG. 1, a block diagram of one embodiment of a system 100 of the present invention is illustrated. The system 100 gathers travel data, analyzes travel conditions, and generates and sends a message to specific travelers. The system 100 includes a travel conditions analyzer 102, several data sources such as websites which communicate with the travel conditions analyzer 102 over a public or private network such as the internet 106, a messaging tool 114 which communicates with the travel conditions analyzer and generates a message regarding the travel condition data, and a communication device 116 possessed by the traveler which communicates with the messaging tool and receives the message generated by the messaging tool. Additionally, the travel conditions analyzer 102 may communicate with a broadcast data source such as a television or radio, an internal or external data source 108 connected directly to the travel conditions analyzer such as a GDS and an internal or external database 112.

Figure 2:
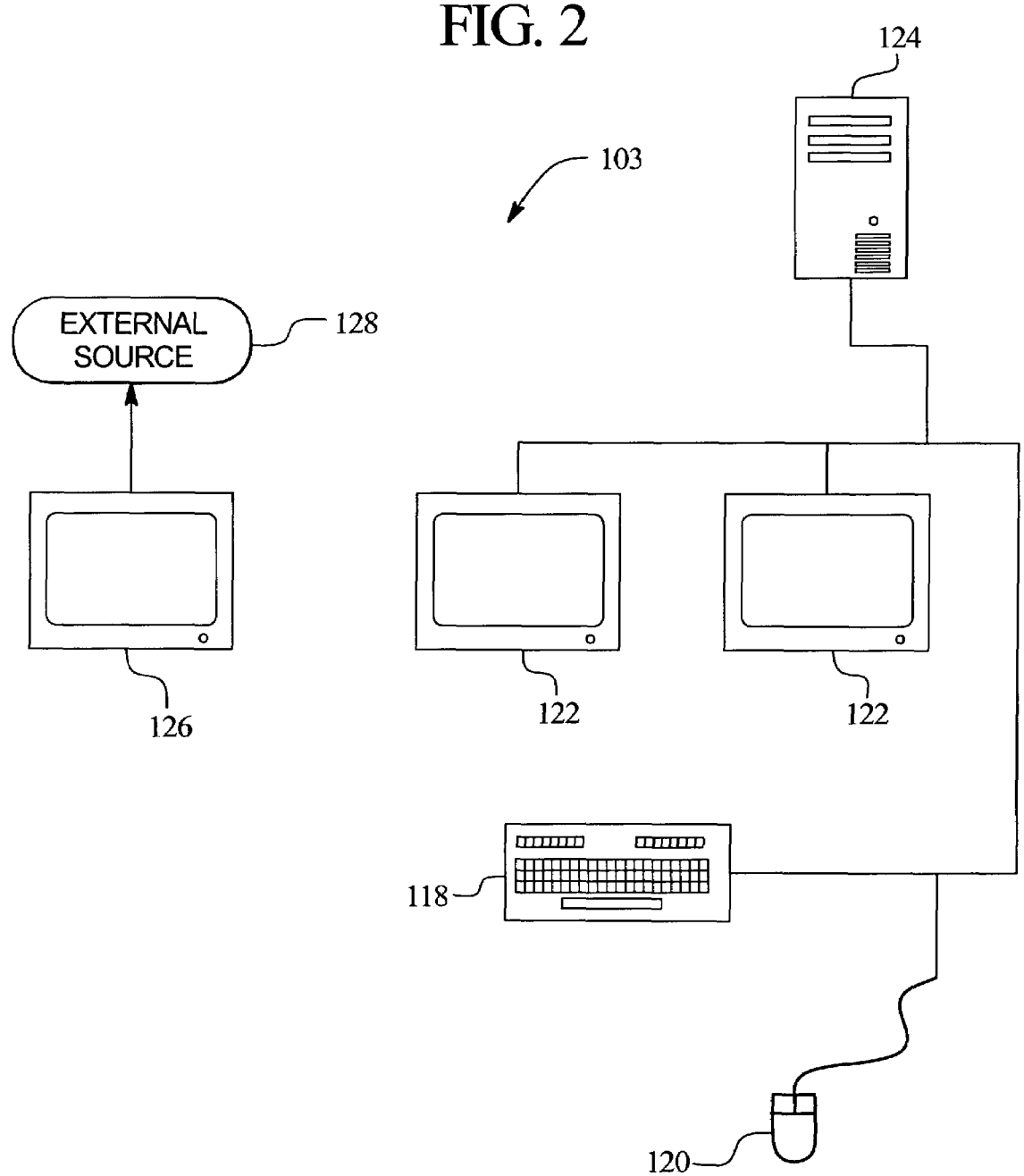
FIG. 2 is a schematic diagram of the travel conditions analyzer console.

Referring to FIGS. 1 and 2, the travel conditions analyzer 102 is one component of the present system. The travel conditions analyzer may be a completely automated system, a semi-automated system or a manual system. In an automated system various input data from predefined sources are analyzed according to complex rules developed to predict air traffic conditions based on air traffic volume, weather conditions, air traffic control delay management programs, and the like. In a semi-automated system, some conditions and delays may be predicted automatically, whereas others will require an operator to interpret the various input conditions. Alternatively, a semi-automated system may pre-process the data and alert the operator to certain potential problem areas. The operator may then examine the potential problem areas further and then make predictions as to how the circumstances will affect passengers. In a manual system, an operator experienced in air traffic control and delay management actively accesses data sources and makes predictions based on experience and knowledge of how the FAA responds to various conditions and manages delays.

FIG. 2 shows a schematic representation of a travel conditions analyzer console 103. The travel conditions analyzer console 103 includes an input such as a keyboard 118 or mouse 120, which enables a user to manipulate the data sources and data bases with which the system is in communication to determine travel or flight condition data and information. A set of displays 122 such as computer monitors are employed to track present and future weather conditions and air traffic. The inputs 118 and 120 and the displays 122 communicate with a central processing unit ("CPU") 124 which enables the system and the user to access internal and external data sources and data bases related to travel or flight conditions. One or more separate displays 126, which are connected to an external source such as a satellite system, are also used to receive and analyze outside data such as broadcast data and information. In operation, a user utilizes the travel conditions analyzer 102 to gather data related to travel conditions around the world or in a particular region. The travel conditions analyzer 102 links the user with a server (not shown) through the CPU 124. The user can then obtain travel data and information contained in data sources such as websites, which provide the user with information to make predictions about travel conditions such as flight delays. The user may input information into the travel conditions analyzer to determine which of the data sources and/or databases the user will analyze to determine the travel or flight conditions.

Referring to FIG. 1, data sources 104 such as weather websites, air traffic websites such as the Federal Aviation Administration ("FAA") website and websites related to particular airlines are typical data sources that are consulted to determine or make predictions about present and future travel conditions. Weather websites provide information regarding weather conditions in a particular location such as a city, region or throughout the world. Similarly, the air traffic websites provide information regarding delays of incoming and outgoing flights at various airports. Airline websites are consulted to provide more detailed flight delay information regarding specific flights on a particular airline. Additionally, other data sources such as one or more internal or external data sources 108, broadcast data sources 110 and internal or external databases 112 may be used to gather data and information regarding travel conditions. The internal or external data source 108 is a data source that is connected directly to the travel conditions analyzer such as a telephone connection to a GDS or similar external source which provides travel data and information to the travel conditions analyzer. The broadcast data sources 110 include television, radio and satellite broadcasts as well as other similar broadcast data and information. The internal or external database 112 may be a database stored locally such as in the memory device of a computer or at a regional site which is accessible by the travel conditions analyzer 102 to determine travel conditions. It should be appreciated that other suitable websites and related data sources may be consulted to make predictions about present and future travel conditions relating to airline flights and other modes of transportation.

The messaging tool 114 is a software program which identifies when, where, and who will be affected by the predicted travel delays such as flight delays. For example, the messaging tool 114 identifies the flights and passengers affected by adverse travel conditions in a particular region or airport on a particular date. The messaging tool 114 communicates with the travel conditions analyzer 102 to receive flight information and predictions on flight delays from that information. Based on predictions, the messaging tool 114 identifies the particular flights and passengers on those flights that are affected by the flight delay predictions. Specifically, the messaging tool 114 accesses a database of ticketed passengers and cross references the region, airports or flights affected by the predicted delay to determine which passengers must be informed about the delays.

The messaging tool 114 then generates a message which explains the particular flight delay or delays. The message may be automatically generated by inputting predetermine flight delay messages and cross-referencing those messages with codes associated with a particular flight delay prediction. The message may also be manually input by a user or operator. In one embodiment, the messaging tool or user generates a prompt or message explaining the travel delay such as a flight delay. The message may include such information as the time of the delay, the types of delays, the status of the particular flights such as boarding times and the expected length of delay based on the conditions. Additionally, the message may be one or more predetermined messages which are input into the messaging tool and cross-referenced with particular types of delays and/or particular lengths of delays.

Once a message is generated, it is sent to the affected passenger or passengers. The message may be sent to an affected passenger's personal computer such as with an electronic mail message. The message may also be sent in other ways such as by sending an automated message over a telephone line to an affected passenger's telephone or voicemail system. The message may also be sent via facsimile or as a digital message to a person's pager or personal digital assistant ("PDA"). When the person or passengers receive the message, they can act accordingly, whether it is to change their travel arrangements or make other arrangements while they wait out the delay affecting their particular flight. In any event, the present system and method of the present invention saves passengers time and money and especially minimizes the inconveniences experienced by passengers related to traveling by notifying the passengers about travel delays at or approximately at the time the delays are determined.

Figure 3:
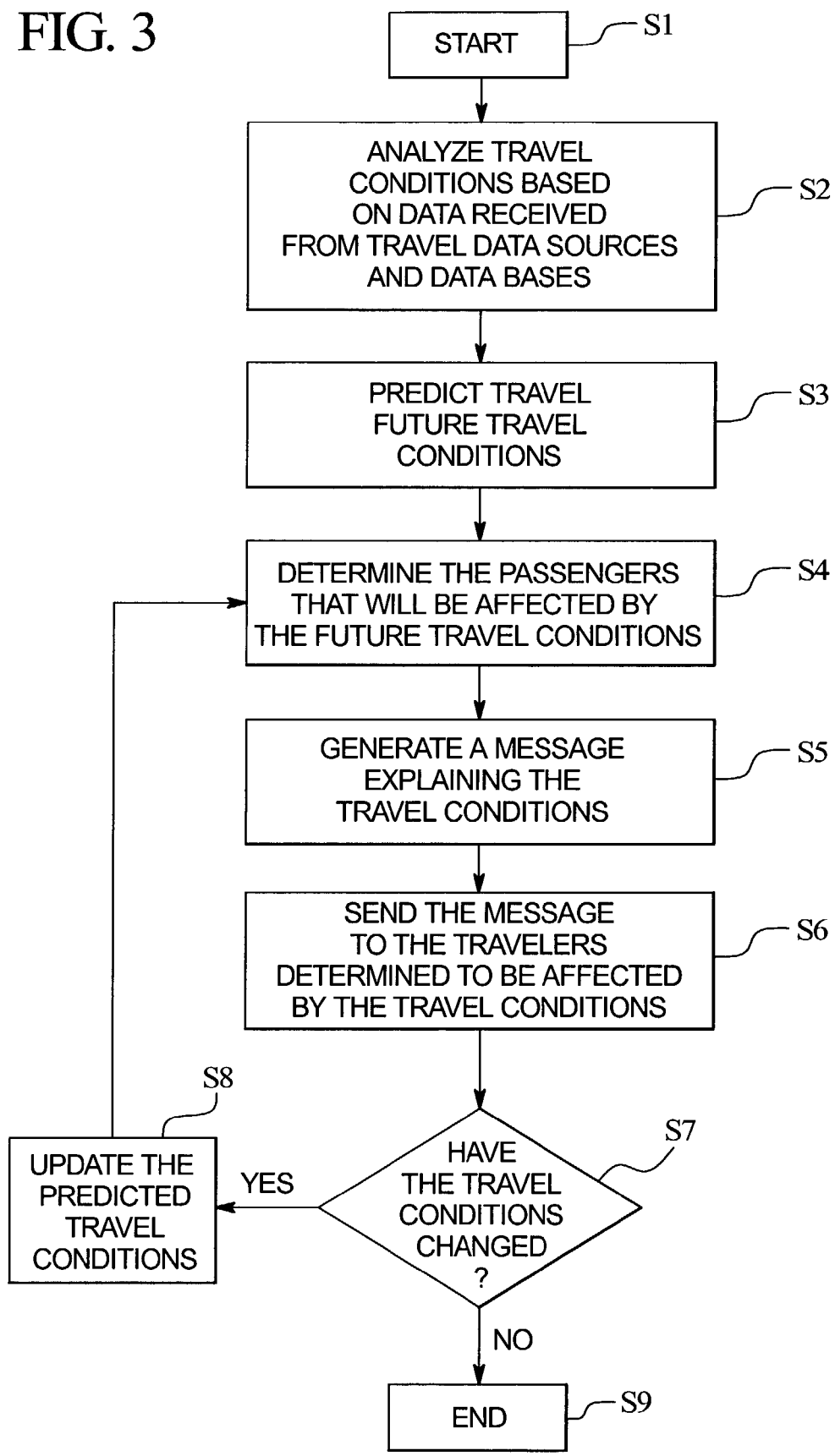
FIG. 3 is a flowchart showing a method of analyzing travel condition data and generating and sending a message explaining the travel condition data to one or more travelers.

In addition to the system 100, the present invention also encompasses a method for generating and distributing passenger travel alert messages. The method for analyzing travel condition data and generating and sending a message explaining the travel conditions to select passengers is best understood by reference to the flowchart shown in FIG. 3 in conjunction with the block diagram of FIG. 1.

The process begins at step S1. At step S2, the travel conditions analyzer 102 gathers and analyzes travel condition data and information from several data sources and databases. The data and information received from those data sources and databases may be data on present and future weather conditions, present and future travel times relating to arrival and departure flights at particular airports, and actual delays regarding particular airlines. The travel conditions analyzer 102 analyzes the data and determines whether a travel delay may occur and if a delay does occur, how long that delay may be.

Once the travel conditions analyzer 102 receives and analyzes the data from the data sources and databases, the user makes predictions about present and future travel conditions as indicated in step S3. The predictions may state where particular flight delays are occurring or the predictions may include the types of delays and the estimated length of those delays. For example, predictions may be made about where particular airline flight delays are occurring such as the specific airports, and the expected length of those delays. It also may explain that the types of delays such as delays due to mechanical failures on a particular plane or delays due to severe weather conditions which are affecting the flight times at a particular airport. Once the predictions are made, the messaging tool 114 receives the predictions and determines the flights and ticketed passengers that are affected by the travel delays or updated travel conditions as indicated in step S4. After the affected flights and passengers are determined, the messaging tool 114 generates a message that explains the type of delays or travel conditions. The message may be a predetermined message which is input to the messaging tool and automatically sent to the passengers based on codes associated with the type and length of the delays. Alternatively, the travel conditions analyzer 102 enables a user to input a message after determining the type and length of the delays and then send that message to the affected passengers. In step S5, a text message is generated which explains the travel conditions. That message is then sent to the affected travelers or passengers on the particular flights affected by the travel conditions as indicated in step S6.

The message or messages may be sent to the user through various sources of communication. Some of the ways that the message may be communicated to the affected travelers or passengers are by sending an electronic mail message to the passenger's personal computer, sending an automated message over a telephone line to the passenger's voicemail, sending a digital or text message to the passenger's pager or PDA or faxing a transmission explaining the message to the passenger. The type and method of transferring the message to the passenger can be arranged by including an input prompt on the travel website when the passenger purchases their ticket or by having the passenger indicate a preferred method of communication. In this matter, the passenger can be reached and receive the message in almost any location whether the passenger is in the airport, in their car or on the plane itself.

Once the message is sent to the passenger, the passenger can make different travel arrangements or other accommodations based on the type and length of the particular delay. Particularly, if travel conditions change, the present system and method can generate new updates that are sent to the passenger as indicated in steps S7 and S8. In step S8, if the travel conditions change or are updated, the travel conditions analyzer 102 updates the predictions based on the new travel conditions. The messaging tool 114 then determines which passengers are affected by the updated travel conditions in step S4 and generates a message explaining the updated travel conditions in step S5. As described above, the message is sent to the affected passengers in step S6 and the passengers can make new accommodations or arrangements based on this updated information. When the travel conditions have not changed or are not affected, updates are not sent and the passengers continue with their travel plans.

Figure 4:
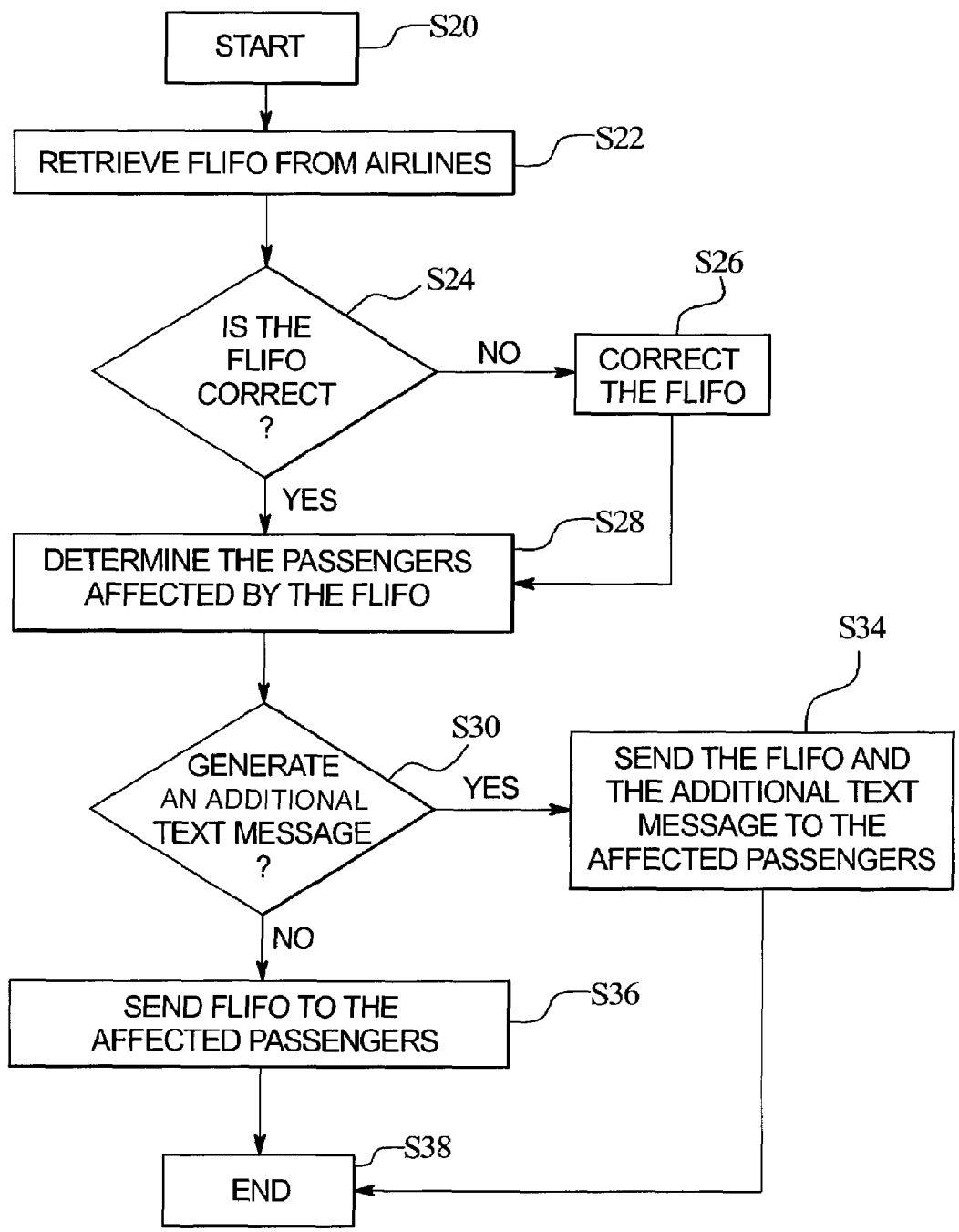
FIG. 4 is a flowchart showing a method of analyzing travel condition data and generating and sending a message explaining the travel condition data to one or more travelers.

The messages generated by the messaging tool 114 are supplemented with flight information ("FLIFO") from the airlines. FLIFO is information generated by the airlines regarding the status of specific flights. In FIG. 4, a method of receiving the FLIFO and sending the FLIFO to affected passengers is illustrated. The FLIFO may include information such as the flight number, delay time and the cause of the delay. The FLIFO is generated by the airlines and sent to a global distribution system (GDS) such as Worldspan. The method according to this embodiment starts at step S20. In step S22, the travel conditions analyzer 102 accesses the GDS to retrieve the FLIFO information via a communication line such as a telephone line. The travel conditions analyzer retrieves FLIFO related to specific flights and transfers that information to the messaging tool 114. The messaging tool 114 determines if the FLIFO makes sense or if it's correct as indicated in step S24. If the messaging tool 114 determines that the FLIFO does not make sense or that it is incorrect due to an error during transfer of the FLIFO or some other problem, the messaging tool sends a manual prompt or cue to the travel conditions analyzer 102. The travel conditions analyzer corrects the FLIFO based on travel data and information received from the data sources and databases and then sends the corrected FLIFO to the messaging tool 114 to be re-sent to one or more of the affected passengers. If the messaging tool 114 determines that the FLIFO is correct in step S24, the messaging tool determines or identifies the passengers that are affected by the FLIFO in step S28.

A text message may also be attached to the FLIFO depending on several factors such as the types of delays and the length of the delays. The text message may include any suitable information such as restaurant, hotel and car rental information. This information is used by the affected passengers to make alternate plans and/or alternate travel arrangements, if necessary. For example, if the FLIFO indicates that an affected passenger's flight departure is delayed for two hours, a text message describing restaurants located near the airport and directions to those restaurants could be sent to the passenger. Thus, the passenger could go get something to eat at one of the indicated restaurants and return later to catch his or her flight without incurring the time and trouble of finding a suitable restaurant and then figuring out how to get to that restaurant.

In step S30, the messaging tool 114 determines if an additional message should be attached to the FLIFO based on predetermined factors described above. If the text message is needed, the message is generated and attached to the FLIFO and sent to the affected passengers in step S34. The FLIFO and text message may be sent by any suitable communication method or device such as an electronic mail message. In one embodiment, the text message is generated and attached to the FLIFO automatically. In this embodiment, the text messages are input to the messaging tool and include codes associated with predetermined factors or information such as airport names, length of the flight delays and airline names. The text messages may include any suitable information such as the location of nearby restaurants, the location of bookstores or other messages that may be useful to the passenger if a particular flight is delayed for a long period of time. Also, the message may include information such as nearby hotels and hotel availability, rental car information and location, or the location of alternate modes of transportation in the event that the flight is delayed for a substantial period of time or if the flight is cancelled. The text messages may be sorted according to one or more of the above factors. It should be appreciated that other suitable information may be used to sort the text messages. Based on the FLIFO and the status of the affected passenger such as the location of the passenger, the messaging tool generates the appropriate text message and sends it to the affected passenger. Alternatively in another embodiment, the user manually generates a text message similar to the message described above, attaches the text message with the FLIFO and sends the FLIFO and text message to the affected passenger or passengers.

If the messaging tool 114 determines that a text message is not needed or required based on the FLIFO, then only the FLIFO is sent to the affected passengers as described above.

In either case, the method ends at step S38. The FLIFO and text messages minimize the inconveniences to passengers. Thus, the passengers receive the FLIFO and/or the text message and can change their travel arrangements or make alternate travel plans such as staying at a hotel based on that information.

Referring to FIGS. 5 through 18, an example of one embodiment of the system and method of the present invention is illustrated. The travel condition analyzer, be it an automated, semi-automated or manual system, accesses data sources such as the data sources shown in FIGS. 5 through 12 to gather and analyze information and data relating to travel conditions and specifically flight conditions in a particular area or region of the world. In this example, the travel conditions analyzer is concerned with airline travel in the United States. The travel conditions analyzer gathers flight condition information from several different data sources. One such data source is shown in FIG. 5, which is the Federal Aviation Administration ("FAA") website. The FAA website includes detailed information regarding flight delays in the United States. Specifically, the FAA website includes several delay displays 200 which indicate flight delays at one or more airports. The delay displays include information on flight delays, such as ground delays, ground stops, airport closures, deicing delays, runway delays and other types of delays. The travel conditions analyzer reviews this information to make predictions on the flights which will be affected by the delays.

Figure 6:
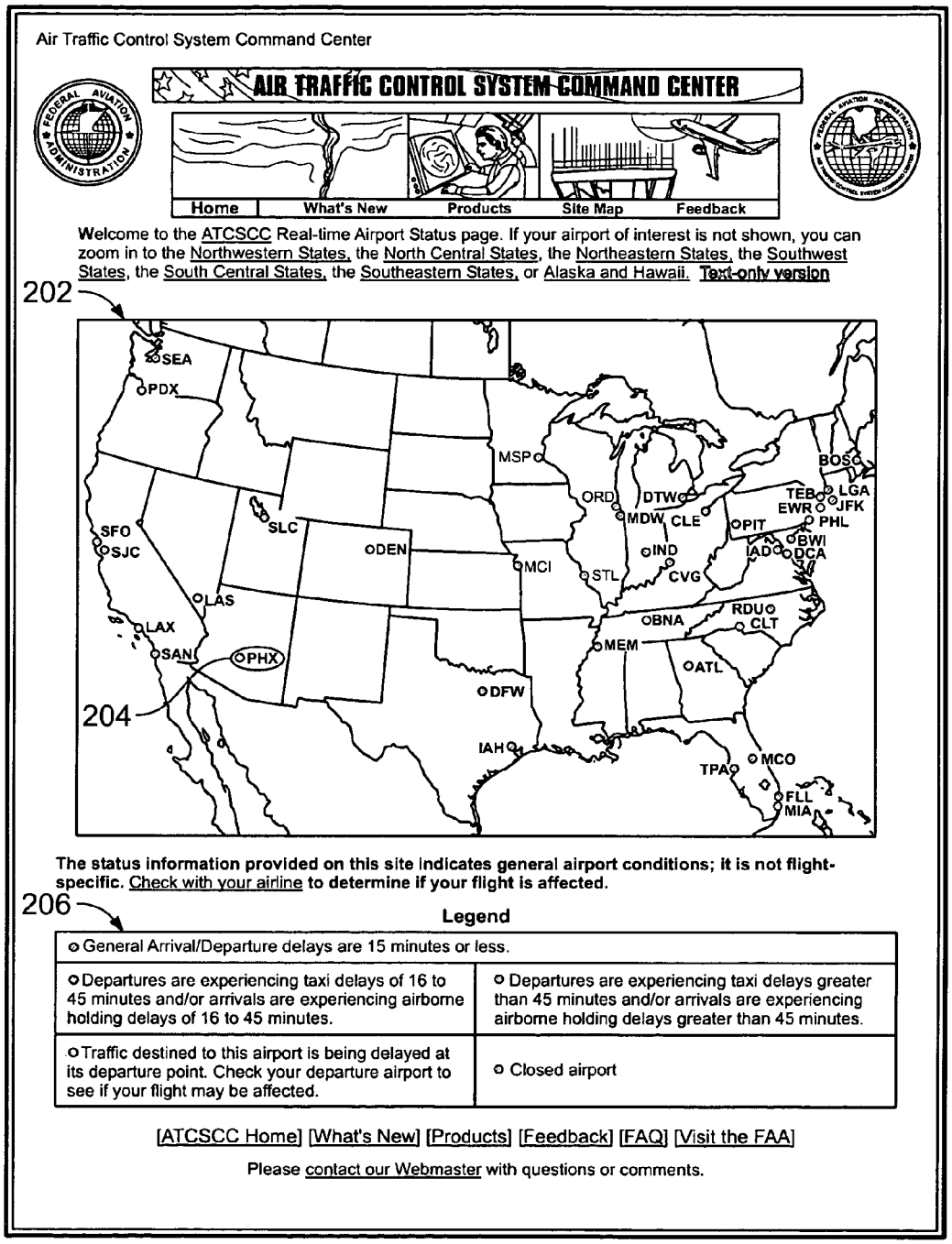
FIG. 6 is a screen shot of another data source used in one embodiment of the system and method of the present invention.
Figure 9:
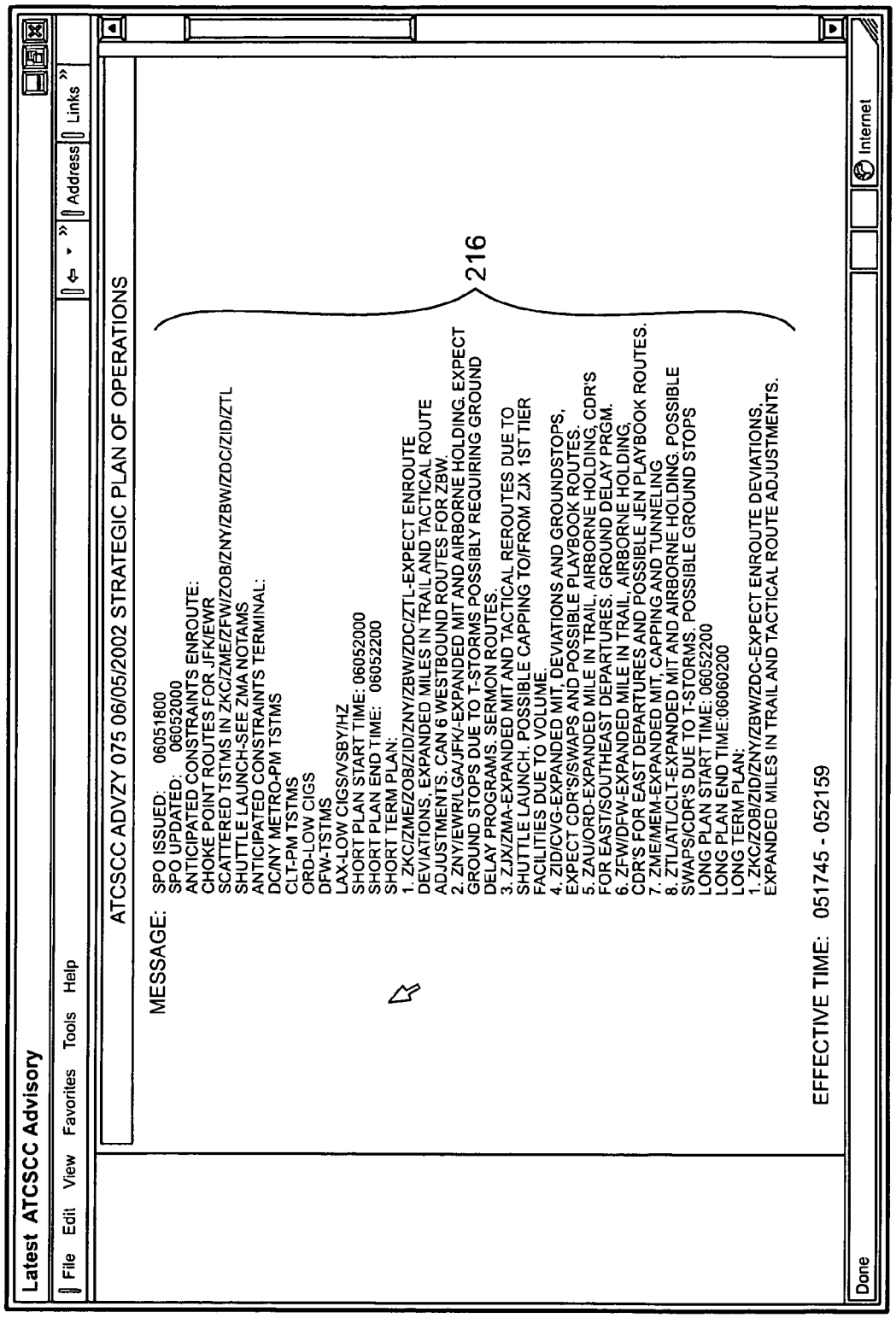
FIG. 9 is a screen shot of detailed flight information from a data source providing air traffic control data and information.

Additionally, the travel conditions analyzer uses other data sources such as the air traffic control data source shown in FIG. 6. In this example, the air traffic control data source indicates major airports located in the United States, as indicated by airport display 202 and associates a color with those airports to indicate a particular type of delay as described in legend 206. If the travel conditions analyzer is interested in a particular delay at a particular airport the analyzer clicks on the airport indicator 204 using a mouse or other suitable input device to retrieve information on that particular airport. In this example, the travel conditions analyzer clicked on the Philadelphia International Airport in Philadelphia, Pa. In FIG. 7, an airport identifier 208 indicates the selected airport, which is the Philadelphia International Airport. The travel conditions analyzer may select a different airport by inputting or selecting the airport from the airport indicator display 210 and then clicking on the airport input 212. The travel conditions analyzer may also obtain more detailed airport delay information regarding an airport of interest by clicking on an airport indicator 204 using a mouse or using any other suitable input. In this example, the travel conditions analyzer clicked on the Philadelphia International Airport identifier 208 to reveal additional flight delay or detailed flight delay information regarding that airport.

Referring to FIG. 8, a detailed display 214 indicates detailed delay information regarding the Philadelphia International Airport. The travel conditions analyzer uses this information to determine or form flight delay predictions for flights arriving and departing from the Philadelphia International Airport. Additional air traffic control data may be obtained from the air traffic control website such as the flight data 216 shown in FIG. 9. This data provides the analyzer with specific delay information regarding flights at airports in the United States.

Figure 10:
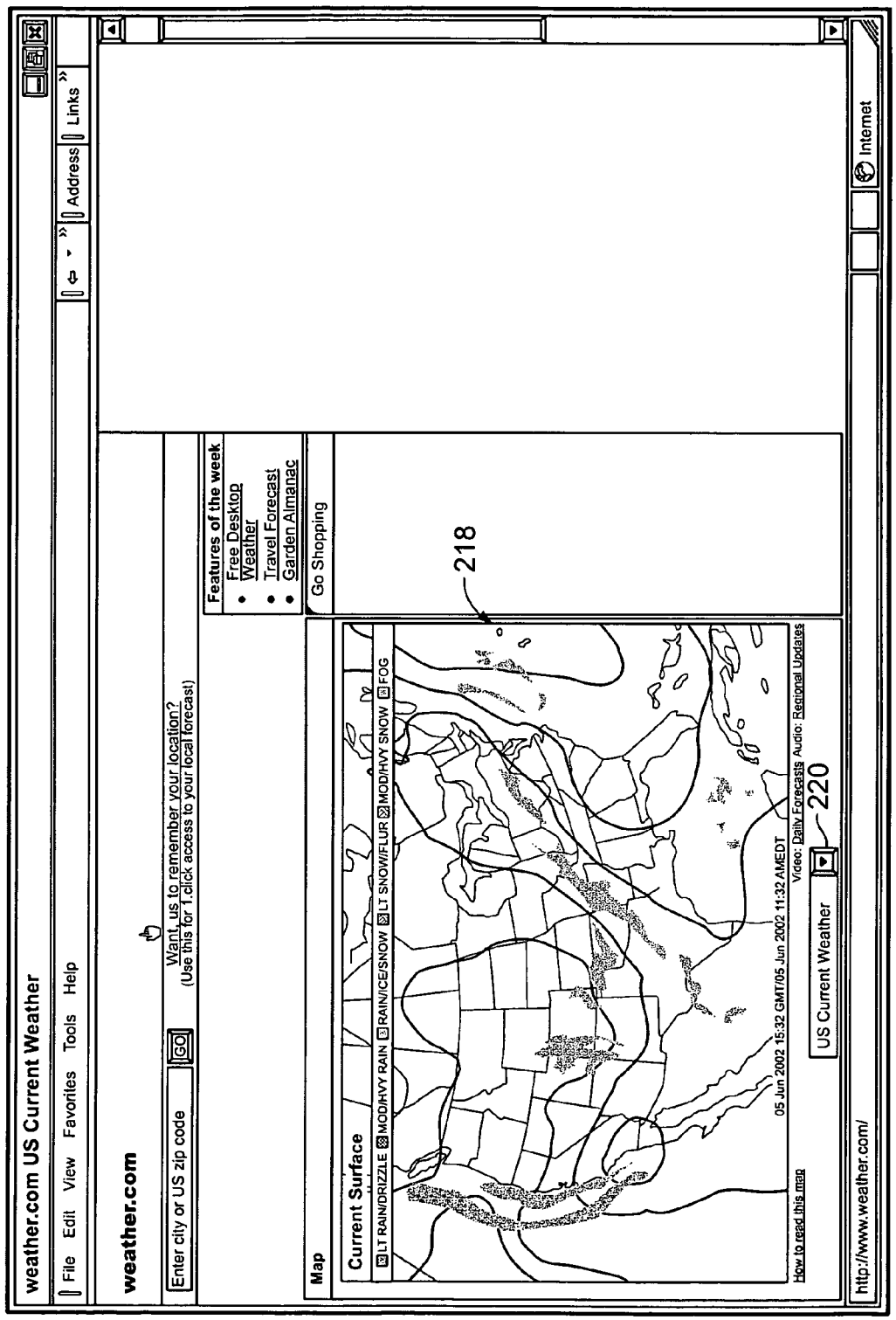
FIG. 10 is a screen shot of a data source used in one embodiment of the system and method of the present invention where the data source provides weather condition data and information.
Figure 11:
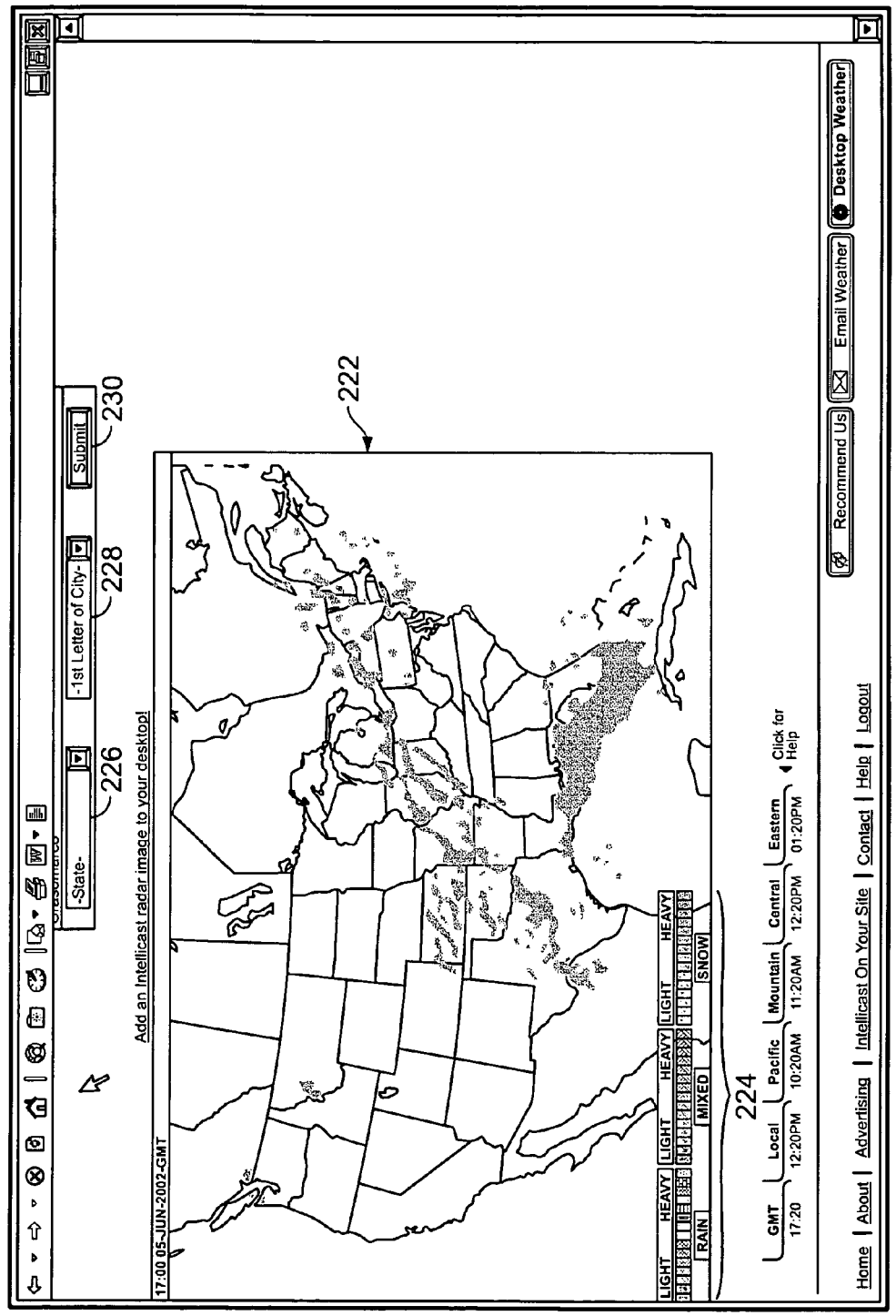
FIG. 11 is a screen shot of another data source used in one embodiment of the system and method of the present invention where the data source provides weather condition data and information.
Figure 12:
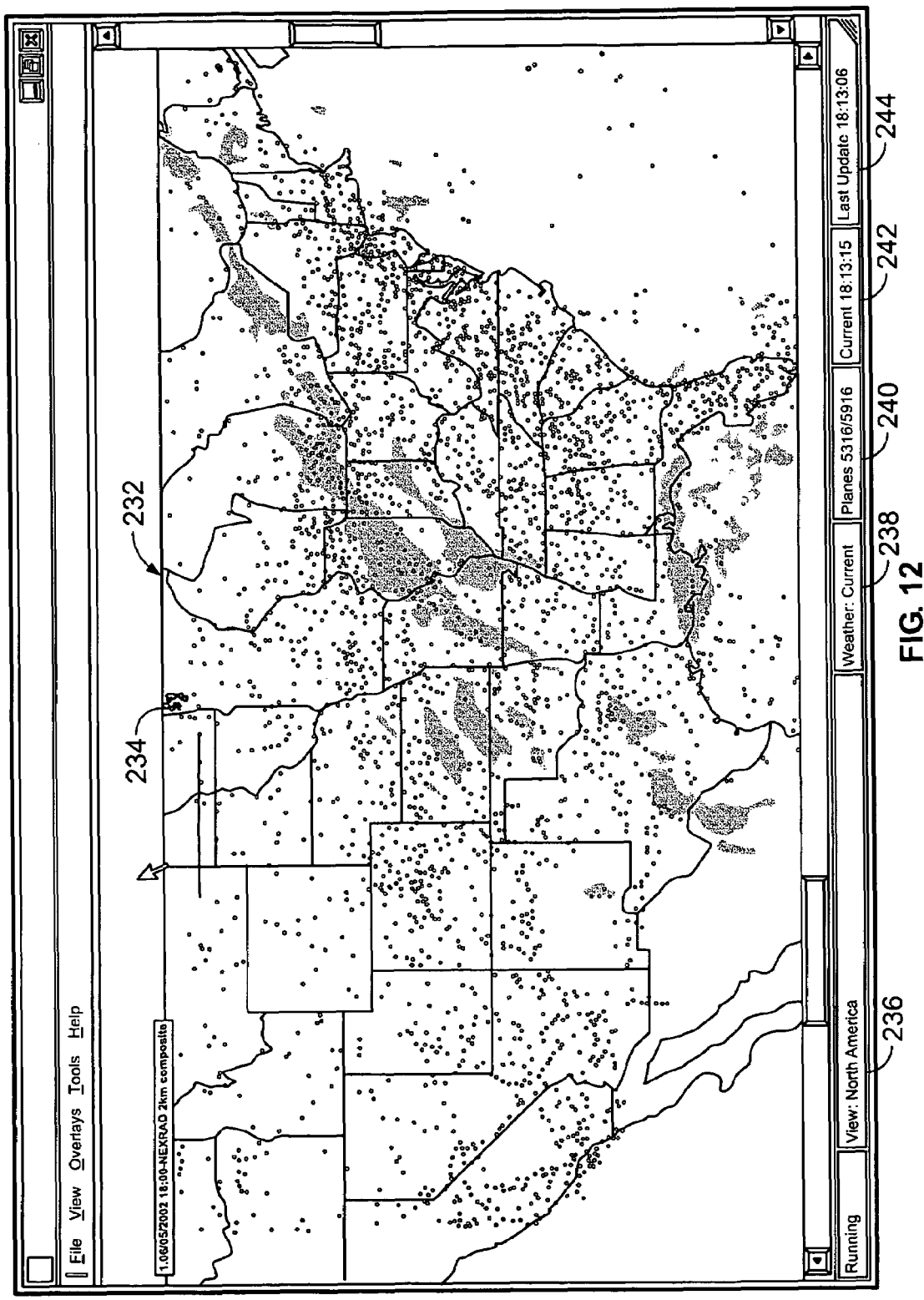
FIG. 12 is a screen shot of a data source used in one embodiment of the system and method of the present invention where the data source shows detailed flight data and weather condition data for the United States.

The analyzer also gathers and reviews data information regarding weather conditions in the United States as illustrated in FIG. 10. The weather map 218 indicates different weather conditions or patterns in the United States. The travel conditions analyzer reviews this information and cross-references the information with the locations of airports in the United States to make predictions about flight delays at specific airports. Additionally the travel conditions analyzer can input a particular city in the United States using input 220 to obtain updated weather information regarding that city. The analyzer may also use or refer to other data sources such as the weather web page indicated in FIG. 11. This web page displays a map of the United States and the weather conditions related to areas in the United States as shown in the weather display 222. On this web page the analyzer may input the city and/or state by using the state input 226 and the city input 228. Once the analyzer determines which city to obtain detailed weather information on, the analyzer presses or clicks on input 230 to submit the request. The web page then returns weather information regarding the requested city.

The travel conditions analyzer also uses other data sources such as the air traffic display 232 which indicates the location of flights in the United States. Each flight that is presently traveling to or from a destination or airport in the United States is indicated by a flight symbol 234. The flight symbols are real time symbols which show specific flights traveling in the United States. Additionally this web page indicates the specific region of interest as indicated by the region display 236. The web page also describes the current weather conditions as shown on the map and in the weather condition display 238, the number of planes presently airborne in the United States as indicated by plane display 240 and the current time as shown in time display 242 and the most recent update of the flight information as indicated in the update display 244. One or more aspects of this information is used by the analyzer to make predictions on flight delays.

Figure 13:
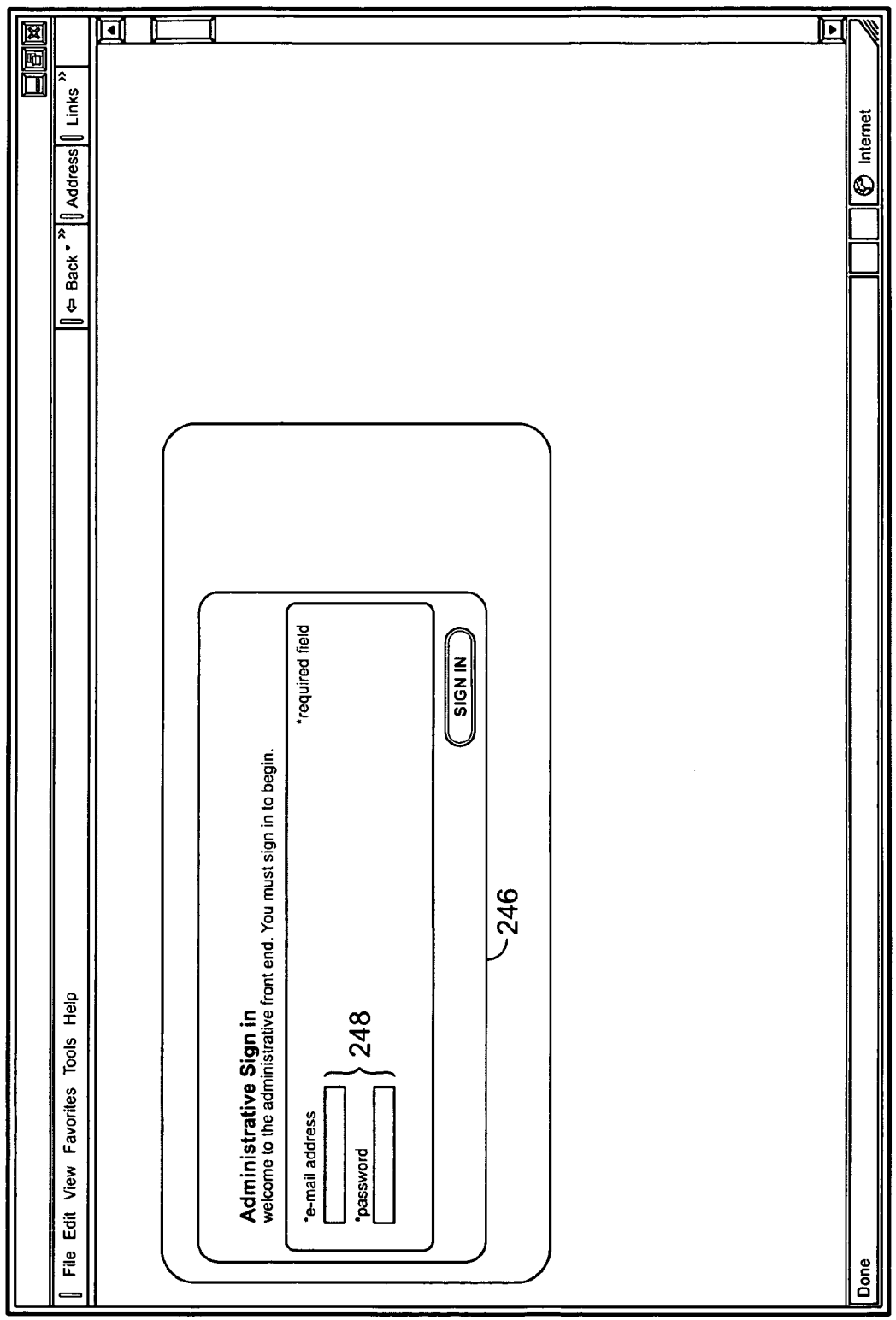
FIG. 13 is a screen shot of a prompt displayed to a travel conditions analyzer to enter and use the messaging tool of one embodiment of the present invention.

Once the travel conditions analyzer gathers and analyzes the information from the data sources as described above, the analyzer uses the messaging tool to enter predictions and messages regarding flight delays in the United States. The analyzer accesses the messaging tool through a secure access prompt 246 as shown in FIG. 13. Additionally, the prompt 246 requests detailed information regarding the analyzer such as e-mail address and password inputs 248. The analyzer enters the required information in the inputs 248 to access the messaging tool.

Figure 14:
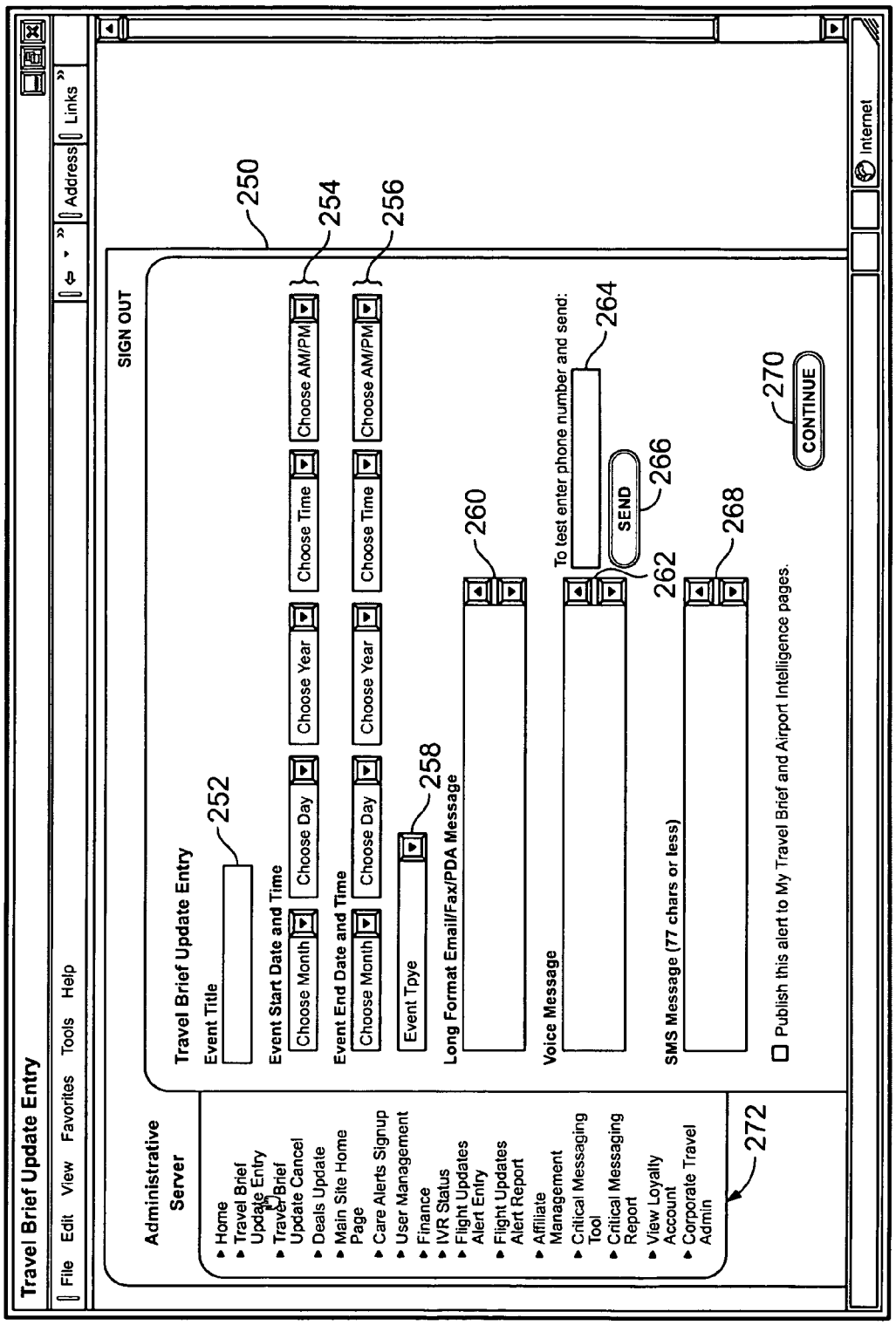
FIG. 14 is a screen shot of a flight data entry prompt displayed to the user while using the messaging tool.
Figure 15:
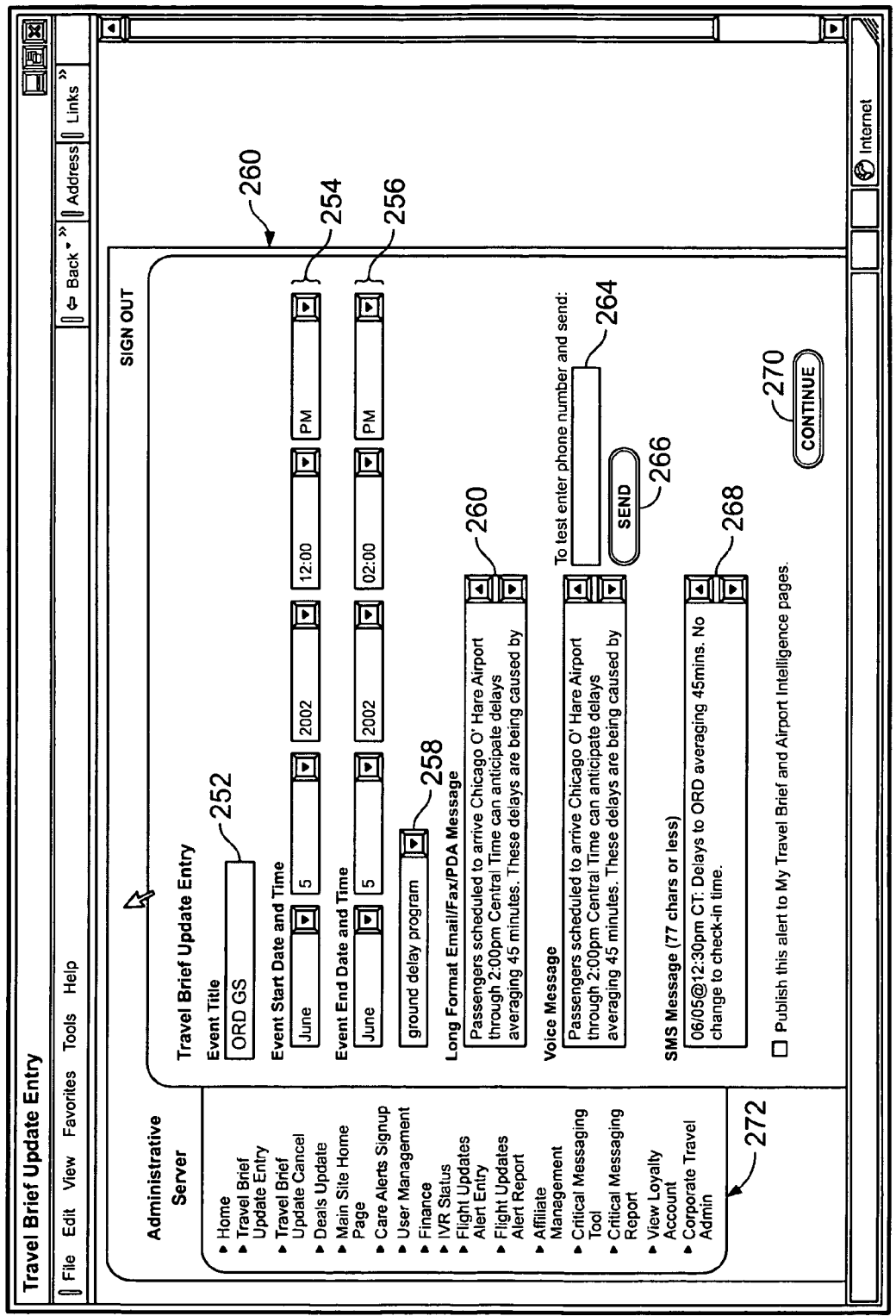
FIG. 15 is a screen shot of an example of flight data entered into the flight data entry prompt of FIG. 14.
Figure 16:
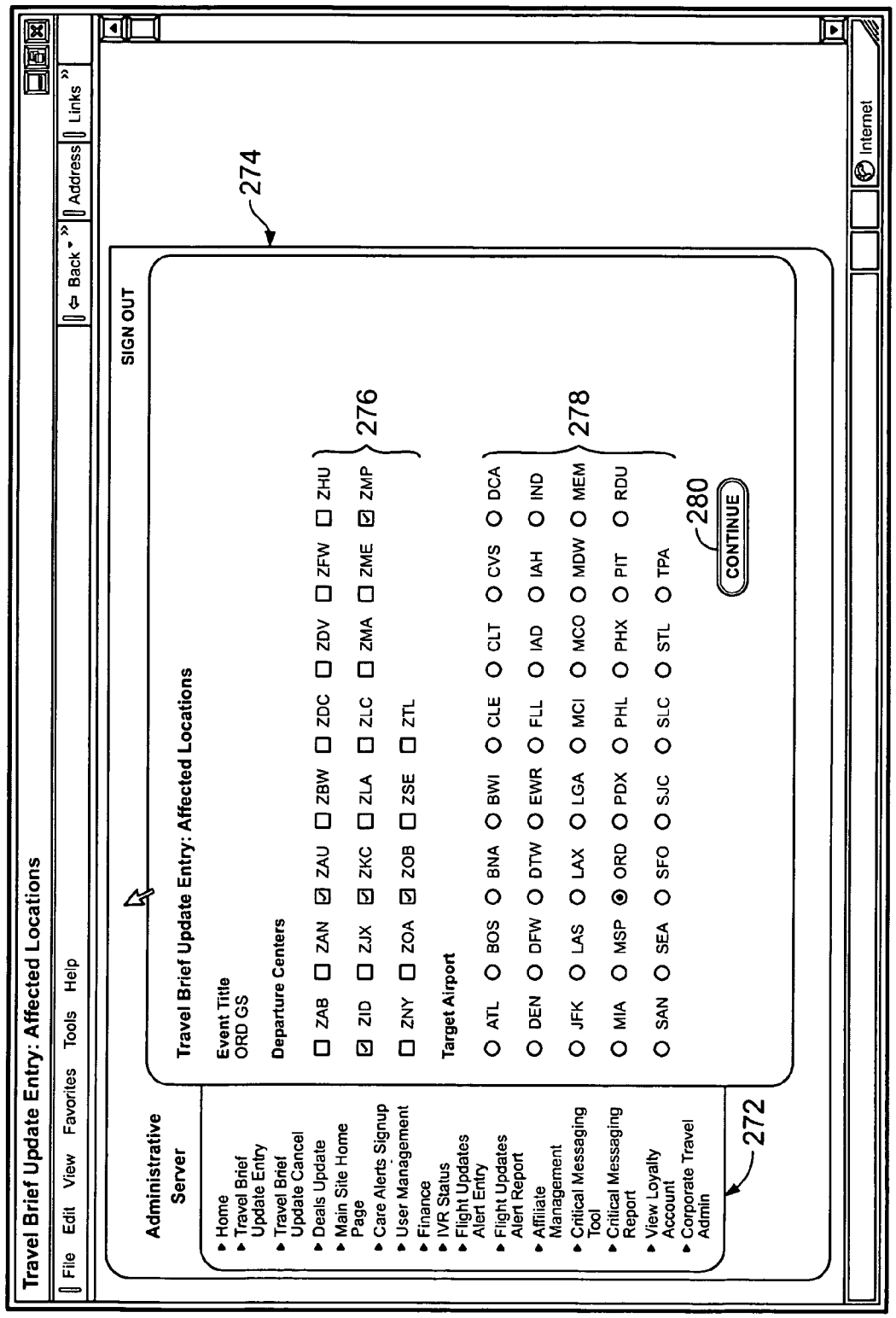
FIG. 16 is a screen shot of another flight data entry prompt where the travel conditions analyzer inputs flight locations affected by delays.

In FIG. 14, the analyzer enters the desired information regarding the type of delay as indicated in the event title display 252, the event start date and time and the event end date and time as shown in event displays 254 and 256, the event type as shown in the event type display 258. Once this information is entered by the analyzer the analyzer generates a message and inserts that message in one or more of the message displays 260, 262 and 268, respectively, based on the type of message being sent to the affected passengers. The message may be any type of message which explains the flight delay to the affected passenger. In the message display 260 the analyzer sends a message via electronic mail, facsimile transmission or to a passenger's personal digital assistant. The message display 262 indicates a voice message to an affected passenger. Once the voice message is inputted into the display 262 the analyzer enters the specific phone number in input 264 and presses the send button 266 to deliver the voice mail message the affected passenger. The phone numbers entered in the number display 264 may be individually or independently generated by the analyzer or obtained from a data base including the specific passengers on the affected flights. The analyzer may also analyze or use other functions of the messaging tool as indicated by the function display 272. Once the necessary information has been inputted into the messaging tool regarding the flight delays the analyzer presses the continue button 270 to proceed.

Figure 17:
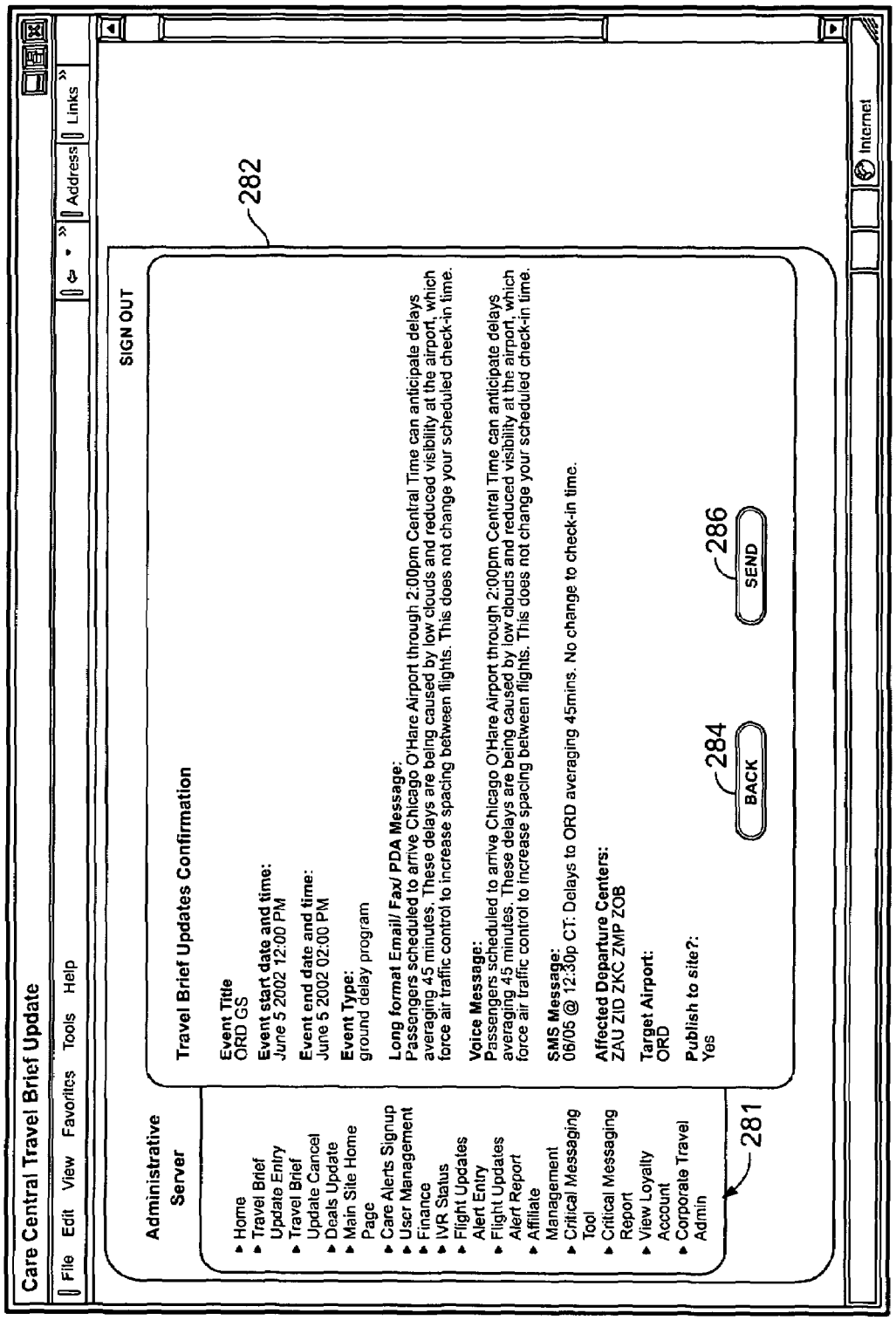
FIG. 17 is a screen shot of a confirmation prompt which is displayed to a player after the flight data has been inputted in the flight data entry prompt of FIG. 14.
Figure 18:
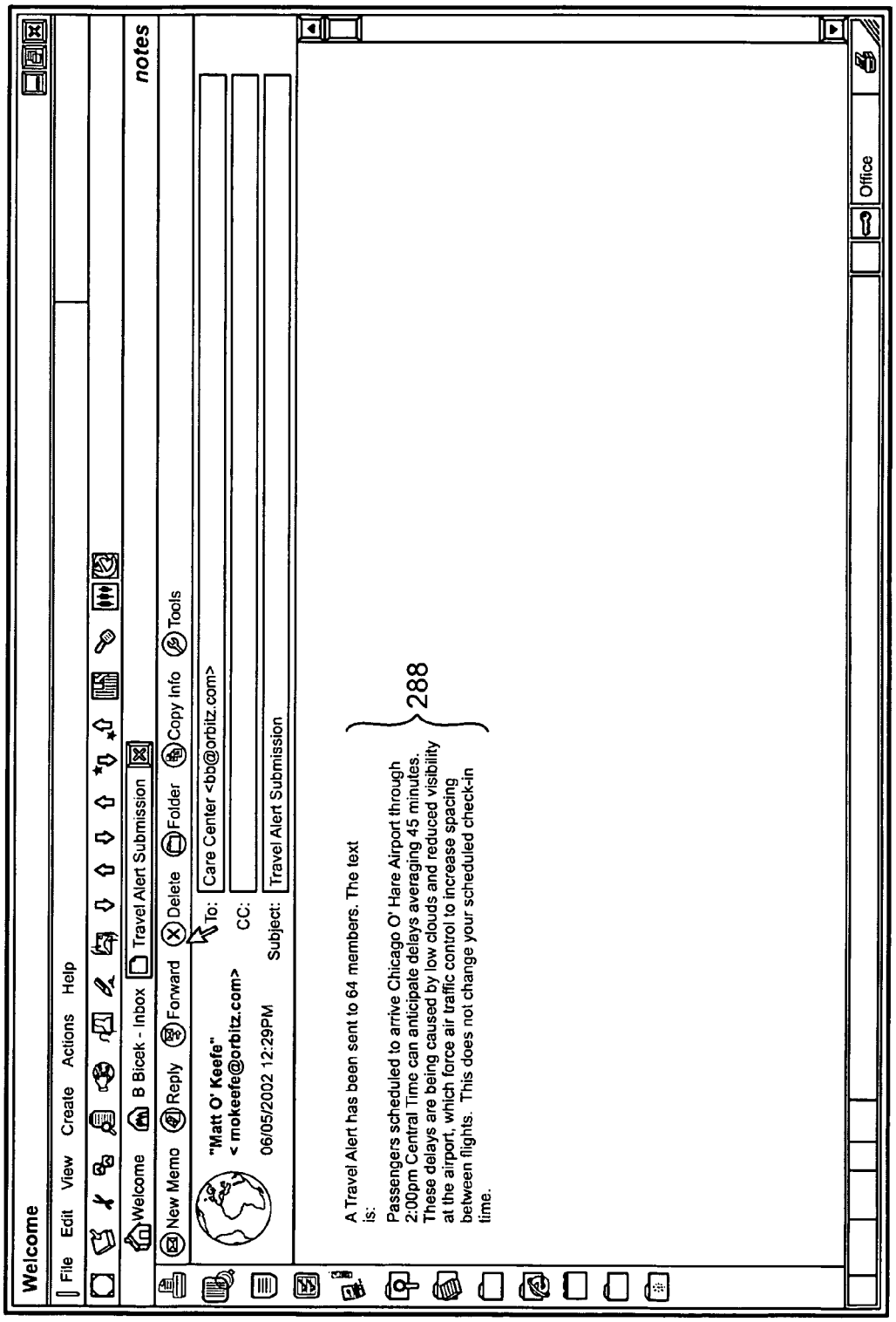
FIG. 18 is a screen shot of a confirmation message generated by the messaging tool.

The messaging tool then displays another query page 274 which indicates specific departure locations such as airports 276 and other target airports 278 that are affected by the predicted flight delays. The analyzer indicates the departure centers or airports and target airports affected by the predicted delay. When the analyzer has completed indicating the affected airports, the analyzer activates or presses the continue button 280 to proceed with the flight delay alert. The messaging tool then displays a confirmation page 282 as shown in FIG. 17 wherein the confirmation page displays all of the information generated by the analyzer. The analyzer has the option of going back and re-inputting the information that may be incorrect or that the analyzer wants to change by pressing or clicking on the back button 284. If the information is satisfactory or correct the analyzer activates or presses the send button 286. If the analyzer presses the send button 286, the message generated by the analyzer and the number of affected passengers that the message was sent to is displayed as shown in FIG. 18. Thus, the travel alert or update has been sent to the affected passengers to explain the flight delays affecting those passengers. The analyzer continues to review the data sources and make predictions regarding the flight conditions.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A computer implemented system for generating a message regarding an airline passenger's travel arrangements and communicating the message to the passenger, the system comprising:
   a data-gathering tool for gathering data relating to an airport from which travel conditions may be predicted, said airport related data provided by an airport indicator that identifies the airport from a plurality of airports respectively associated with a plurality of airport indicators, wherein the airport indicators are actuatable and provide access to airport related data including airport identifiers, wherein the airport identifiers include selectable input on a website, said airport indicators identified by location on an airport display of an air traffic control data source, wherein said airport related data for the particular airport is obtained in response to actuation of the associated airport indicator;
   a data analyzer means for analyzing the data and making a prediction regarding the travel conditions; and
   a messaging tool adapted to determine a group of passengers whose flights will be affected by the prediction by cross-referencing passengers having flight tickets with flights that are affected by the travel conditions and send a message to the passengers in the group, the messaging tool adapted to access a database having information regarding ticketed passengers and to cross-reference the information with data relating to the airport affected by the predicted travel conditions to determine which passengers are to receive the message.

2. The system of claim 1, further comprising gathering data from airline websites.

3. The system of claim 1, further comprising gathering data from weather websites.

4. The system of claim 1, further comprising gathering data from an air traffic data website.

5. A computer implemented method of providing travel updates to travelers, said method comprising the steps of:
   gathering data regarding travel conditions including gathering data relating to an airport identified as one of a plurality of airports by an airport indicator, the plurality of airports respectively associated with a plurality of airport indicators, wherein the airport indicators are actuatable and provide access to airport related data including airport identifiers, wherein the airport identifiers include selectable input on a website, said airport indicators identified by location on an airport display of an air traffic control data source, wherein said data relating to the airport is obtained in response to actuation of the airport indicator associated with the particular airport;

making a prediction regarding travel conditions based on the data;

associating communication devices with respective travelers that have individually designated at least one communication device to receive messages;

providing a messaging tool for identifying at least one communication device designated to receive messages by at least one traveler who will be affected by the predicted travel conditions;

generating a message explaining the predicted travel conditions; and sending the message to the identified communication device designated by the associated traveler via said messaging tool.

6. The method of claim 5, wherein the step of gathering data regarding travel conditions includes analyzing weather conditions.

7. The method of claim 5, wherein the step of gathering data regarding travel conditions includes analyzing airline operational data which includes flight arrival and departure data.

8. The method of claim 5, wherein the step of gathering data regarding travel conditions including analyzing air traffic data from an air traffic website.

9. The method of claim 5, wherein the step of generating the message explaining the predicted travel conditions is performed manually.

10. The method of claim 5, wherein the step of generating the message explaining the predicted travel conditions is automated.

11. The method of claim 5, wherein the step of sending the message to the identified communication device designated by the associated traveler includes sending an electronic mail message.

12. The method of claim 5, wherein the step of sending the message to the identified communication device designated by the associated traveler includes sending a voice mail message.

13. The method of claim 5, wherein the step of sending the message to the identified communication device designated by the associated traveler includes sending a telephone message.

14. The method of claim 5, wherein the step of sending the message to the identified communication device designated by the associated traveler includes sending a facsimile.

15. The method of claim 5, wherein the step of sending the message to the identified communication device designated by the associated traveler includes sending a digital message to a message receiver.

16. A computer implemented method of providing flight updates to airline passengers, said method comprising the steps of:

gathering air traffic data from an air traffic website, said air traffic website having an air traffic display that displays a location of one or more flights;

analyzing weather conditions;

analyzing airline operational data which includes flight arrival and departure data;

making a prediction regarding travel conditions based on the data gathered and analyzed;

associating communication devices with respective airline passengers that have individually designated at least one communication device to receive messages;

providing a messaging tool for identifying at least one communication device designated to receive messages by at least one airline passenger who will be affected by the predicted travel conditions;

generating a message explaining the travel conditions; and sending the message to the at least one identified communication device designated by the associated passenger or passengers via said messaging tool.

17. The system of claim 1, wherein the messaging tool identifies communication devices that have been designated by the individual passengers of the group to receive messages and sends the message to the designated communication devices identified.

18. The system of claim 17, wherein the messaging tool sends the message to communication devices associated with the individual passengers in which the communication devices are located apart from an airplane predicted to have a flight delay.

19. The method of claim 5, further comprising the step of determining a preferred mode of communication indicated by the traveler for the sending of messages.

20. The method of claim 5, further comprising the step of cross-referencing travelers having travel tickets with travel events, associated with the travel tickets, that are determined to be affected by the prediction regarding the travel conditions.

21. The method of claim 20, wherein the step of cross-referencing travelers includes accessing a database having information regarding the ticketed travelers and cross-referencing the information with the travel events affected by the travel conditions to determine which travelers are to receive the message about the travel conditions.

22. The method of claim 21, wherein the travel events relate to scheduled airline flights, bus trips, railway trips or boat trips.

23. The method of claim 16, further comprising the step of determining a preferred mode of communication indicated by the airline passengers for the sending of messages.

24. The method of claim 16, further comprising the step of cross-referencing ticketed airline passengers with flights that are affected by the travel conditions.

25. The method of claim 24, wherein the step of cross-referencing ticketed airline passengers includes accessing a database of ticketed passengers and cross-referencing the ticketed passengers with at least one of an: (a) airport, (b) region, or (c) flight affected by the predicted travel conditions to determine which airline passengers are to receive the message about the travel conditions.

26. The method of claim 25 wherein the step of sending the message includes sending the message to identified communication devices associated with the individual airline passengers in which the communication devices are located apart from an airplane predicted to have a flight delay.

* * * * *